US012303010B2

(12) United States Patent
Mori et al.

(10) Patent No.: US 12,303,010 B2
(45) Date of Patent: May 20, 2025

(54) INFORMATION PROCESSING APPARATUS AND COMPUTER PROGRAM FOR DECORATING TARGET IMAGES

(71) Applicant: Shiseido Company, Ltd., Tokyo (JP)

(72) Inventors: Yuichiro Mori, Tokyo (JP); Takashi Maruyama, Tokyo (JP)

(73) Assignee: Shiseido Company, Ltd., Tokyo (JP)

( * ) Notice: Subject to any disclaimer, the term of this patent is extended or adjusted under 35 U.S.C. 154(b) by 717 days.

(21) Appl. No.: 17/432,628

(22) PCT Filed: Feb. 6, 2020

(86) PCT No.: PCT/JP2020/004633
§ 371 (c)(1),
(2) Date: Aug. 20, 2021

(87) PCT Pub. No.: WO2020/170845
PCT Pub. Date: Aug. 27, 2020

(65) Prior Publication Data
US 2022/0142334 A1    May 12, 2022

(30) Foreign Application Priority Data
Feb. 22, 2019  (JP) ................................. 2019-030712

(51) Int. Cl.
*A45D 44/00*    (2006.01)
*G06T 11/60*    (2006.01)

(52) U.S. Cl.
CPC ............ *A45D 44/005* (2013.01); *G06T 11/60* (2013.01); *A45D 2044/007* (2013.01)

(58) Field of Classification Search
None
See application file for complete search history.

(56) References Cited

U.S. PATENT DOCUMENTS 10,251,463 B2    4/2019    Yamanashi et al.

FOREIGN PATENT DOCUMENTS

| JP | 2013-171409 A | 9/2013 |
| KR | 101872635 B1 * | 6/2018 |
| WO | WO-2008/102440 A1 | 8/2008 |

OTHER PUBLICATIONS

Translation for KR 101872635 (Year: 2018).*

* cited by examiner

*Primary Examiner* — Lennin R RodriguezGonzalez
(74) *Attorney, Agent, or Firm* — Foley & Lardner LLP

(57) ABSTRACT

An information processing apparatus receives an image of target person to be decorated and at least one evaluator ID that identifies an evaluator different from the target person, generates a plurality of target decoration images in which the image is decorated, stores a plurality of reference decoration images in which images of a plurality of persons are decorated, a reference image score regarding evaluation by an evaluator for each reference decorative image, and evaluator ID of an evaluator evaluating the reference decorative image associated with each other, calculates target image score for evaluation for each target decorative image based on the reference image score associated with the received evaluator ID among the plurality of reference image scores, and presents at least one target decorative image whose target image score satisfies a predetermined condition among the plurality of target decoration images.

17 Claims, 20 Drawing Sheets

FIG. 3

| USER INFORMATION DATABASE | | | |
|---|---|---|---|
| USER ID | USER NAME | USER ATTRIBUTE | |
| | | GENDER | AGE |
| U001 | U1 | FEMALE | 44 |
| U002 | U2 | FEMALE | 27 |
| U003 | U3 | MALE | 19 |
| . | . | . | . |

FIG. 4

| MAKEUP PATTERN INFORMATION DATABASE | | | | | |
|---|---|---|---|---|---|
| MAKEUP PATTERN ID | MAKEUP PATTERN IMAGE | MAKEUP TASTE | TARGET GENDER | TARGET AGE | COSMETIC INFORMATION |
| MM001 | MM1 | COOL | FEMALE | 20's 30's | EYESHADOW: PROE1 CHEEK: PROC1 LIPSTICK: PROR1 · |
| MM002 | MM2 | COOL | FEMALE | 20's 30's 40's | EYESHADOW: PROE1 CHEEK: PROC2 LIPSTICK: PROR2 · |
| MM003 | MM3 | CUTE | FEMALE | 10's 20's | EYESHADOW: PROE2 CHEEK: PROC1 LIPSTICK: PROR3 · |
| MM004 | MM4 | NATURAL | FEMALE | 20's | · |
| MM005 | MM5 | COOL | FEMALE | 40's 50's | · |
| MM006 | MM6 | CUTE | FEMALE | 20's | · |
| MM007 | MM7 | NATURAL | MALE | 10's | · |
| · | · | · | · | · | · |

FIG. 5

| EVALUATOR INFORMATION DATABASE | | | | |
|---|---|---|---|---|
| EVALUATOR ID | EVALUATOR NAME | EVALUATOR ATTRIBUTE | | |
| | | GENDER | AGE | SKILL |
| E001 | E1 | MALE | 37 | MAKEUP ARTIST |
| E002 | E2 | FEMALE | 49 | MAKEUP ARTIST |
| E003 | E3 | FEMALE | 29 | MAKEUP ARTIST |
| E004 | E4 | MALE | 38 | GENERAL |
| E005 | E5 | FEMALE | 28 | GENERAL |
| . | . | . | . | . |

FIG. 6

| REFERENCE IMAGE INFORMATION DATABASE (EVALUATOR ID = E001) | | | |
|---|---|---|---|
| REFERENCE IMAGE ID | REFERENCE REAL FACE IMAGE | REFERENCE MAKEUP IMAGE | REFERENCE IMAGE SCORE |
| IMG001 | RRJPG1 | RMJPG1 | 60 |
| IMG002 | RRJPG1 | RMJPG2 | 90 |
| IMG003 | RRJPG1 | RMJPG3 | 30 |
| IMG004 | RRJPG2 | RMJPG4 | 60 |
| IMG005 | RRJPG2 | RMJPG5 | 80 |
| . | . | . | . |

FIG. 8
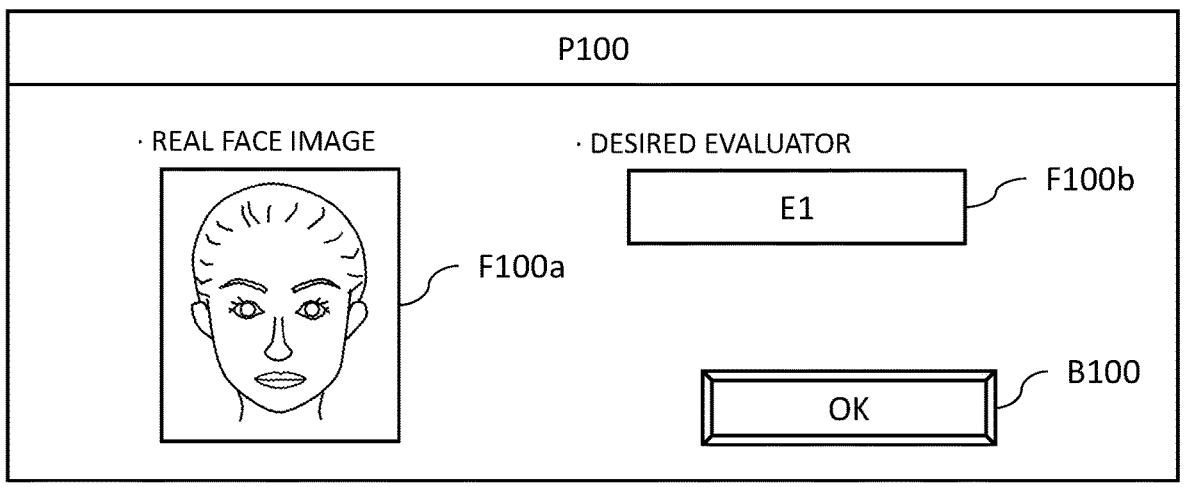
- F100a - F100b
- B100
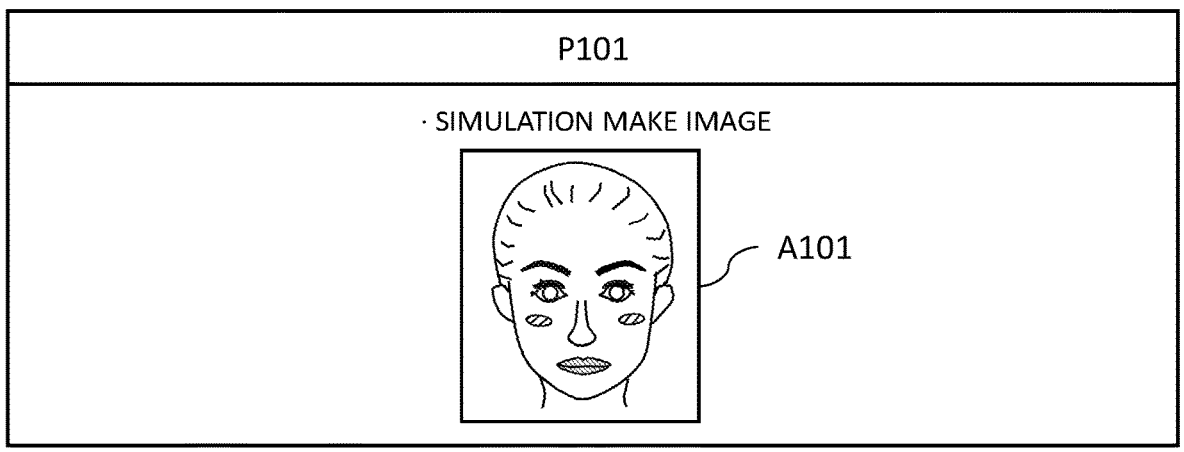

*FIG. 9*

| IMAGE GENERATION LOG INFORMATION DATABASE (User ID = U001) | | | |
|---|---|---|---|
| IMAGE GENERATION LOG ID | TARGET REAL FACE IMAGE | TARGET MAKEUP IMAGE | REFERENCE IMAGE SCORE |
| SIM001 | ORJPG1 | OMJPG1 | |
| SIM002 | ORJPG1 | OMJPG2 | 85 |
| SIM003 | ORJPG1 | OMJPG3 | |
| SIM004 | ORJPG2 | OMJPG4 | 65 |
| SIM005 | ORJPG2 | OMJPG5 | |
| . | . | . | |

FIG. 15

| IMAGE GENERATION LOG INFORMATION DATABASE (User ID = U001) | | | |
|---|---|---|---|
| IMAGE GENERATION LOG ID | TARGET REAL FACE IMAGE | TARGET MAKEUP IMAGE | COSMETIC INFORMATION |
| SIM001 | ORJPG1 | OMJPG1 | EYESHADOW: PROE1<br>CHEEK: PROC1<br>LIPSTICK: PROR1<br>. |
| SIM002 | ORJPG2 | OMJPG2 | EYESHADOW: PROE1<br>CHEEK: PROC2<br>LIPSTICK: PROR2<br>. |
| SIM003 | ORJPG3 | OMJPG3 | EYESHADOW: PROE2<br>CHEEK: PROC1<br>LIPSTICK: PROR3<br>. |
| . | . | . | . |

*FIG. 17*

| CANDIDATE COMMENT INFORMATION DATABASE | |
|---|---|
| CANDIDATE COMMENT ID | CANDIDATE COMMENT TEXT |
| CCOM001 | CCOM1 |
| CCOM002 | CCOM2 |
| CCOM003 | CCOM3 |
| CCOM004 | CCOM4 |
| CCOM005 | CCOM5 |
| . | . |

FIG. 18

| REFERENCE COMMENT INFORMATION DATABASE (EVALUATOR ID = E001) | | | |
|---|---|---|---|
| REFERENCE COMMENT ID | REFERENCE IMAGE ID | REFERENCE COMMENT TEXT | REFERENCE COMMENT SCORE |
| COM001 | IMG001 | COM1 | 60 |
| COM002 | IMG001 | COM2 | 90 |
| COM003 | IMG001 | COM3 | 30 |
| COM004 | IMG001 | COM4 | 60 |
| COM005 | IMG002 | COM5 | 80 |
| . | . | . | . |

FIG. 20
| P100 |
|---|
 • F100a - F100b
• B100
| P601 |
|---|
| · SIMULATION MAKEUP IMAGE | · COMMENT TEXT |
|---|---|
| 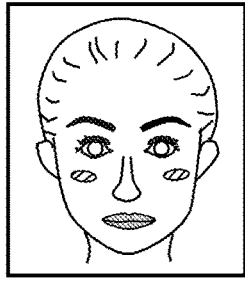 — A601a | CHARM POINT OF YOUR FACE IS ... A LIGHT PINK LIPSTIC SUITS YOU. IT IS GOOD BALANCE FOR YOU TO PUT CHEEK IN HIGH POSITION. · · · — A601b |

INFORMATION PROCESSING APPARATUS AND COMPUTER PROGRAM FOR DECORATING TARGET IMAGES

CROSS-REFERENCE TO RELATED APPLICATIONS

This application is the U.S. National Stage of PCT/JP2020/004633, filed Feb. 6, 2020, which claims priority to PCT/JP2019/030712, filed Feb. 22, 2019.

TECHNICAL FIELD

The present invention relates to an information processing apparatus and a computer program.

BACKGROUND ART

In recent years, decoration (for example, makeup, hair styling, or clothing coordination) is diversified.

In order to select an appropriate decoration from a myriad of options, it is necessary to actually try and compare those options to judge one, which requires a huge amount of time and effort.

It is extremely difficult, especially for those who do not have sufficient knowledge of decoration.

For example, for an appropriate makeup, it is necessary to select a makeup that matches the facial features and reproduce the makeup.

As a technique for improving the technique for makeup, for example, there is one described in Japanese Patent Application Laid-Open No. 2014-149696.

In Japanese Patent Application Laid-Open No. 2014-149696, it compares the user's makeup (method of makeup) with the reference makeup that the user should refer to, evaluates the user's makeup, and presents the result of the evaluation to the user.

As a result, it is possible to present the user with an objective evaluation of the user, so that it is possible to support the makeup including the improvement of the makeup technique.

SUMMARY OF INVENTION

Technical Problem

However, in Japanese Patent Application Laid-Open No. 2014-149696, since the reference makeup that suits the user's face is not presented to the user, the user can know the evaluation of the user's makeup, but cannot know the makeup that suits the user's face.

In addition, since there are individual differences in aesthetic sense (sensitivity), the user's preference is not reflected in the evaluation result for the user's makeup.

As described above, Japanese Patent Application Laid-Open No. 2014-149696 cannot provide a simulation result that matches the user's physical characteristics and reflects the user's preference.

An object of the present invention is to present a simulation result that matches the user's physical characteristics and reflects the user's preference.

Solution to Problem

One aspect of the present invention is an information processing apparatus that:

receives an image of target person to be decorated and at least one evaluator ID that identifies an evaluator different from the target person;

generates a plurality of target decoration images in which the image is decorated;

stores a plurality of reference decoration images in which images of a plurality of persons are decorated, a reference image score regarding evaluation by an evaluator for each reference decorative image, and evaluator ID of an evaluator evaluating the reference decorative image associated with each other;

calculates target image score for evaluation for each target decorative image based on the reference image score associated with the received evaluator ID among the plurality of reference image scores; and presents at least one target decorative image whose target image score satisfies a predetermined condition among the plurality of target decoration images.

Advantageous Effects of Invention

According to the present invention, it is possible to present a simulation result that matches the user's physical characteristics and reflects the user's preference.

BRIEF DESCRIPTION OF DRAWINGS

FIG. 3 is a diagram showing a data structure of a user information database of the present embodiment.

FIG. 4 is a diagram showing a data structure of a makeup pattern information database of the present embodiment.

FIG. 5 is a diagram showing a data structure of an evaluator information database of the present embodiment.

FIG. 6 is a diagram showing a data structure of a reference image information database of the present embodiment.

FIG. 8 is a diagram showing an example of a screen displayed in the information processing of FIG. 7.

FIG. 9 is a diagram showing a data structure of an image generation log information database of the first variation.

FIG. 15 is a diagram showing a data structure of an image generation log information database of third variation.

FIG. 17 is a diagram showing a data structure of a candidate comment information database of fourth variation.

FIG. 18 is a diagram showing a data structure of a reference comment information database of fourth variation.

FIG. 20 is a diagram showing an example of a screen displayed in the information processing of FIG. 19.

DESCRIPTION OF EMBODIMENTS

Figure 1:
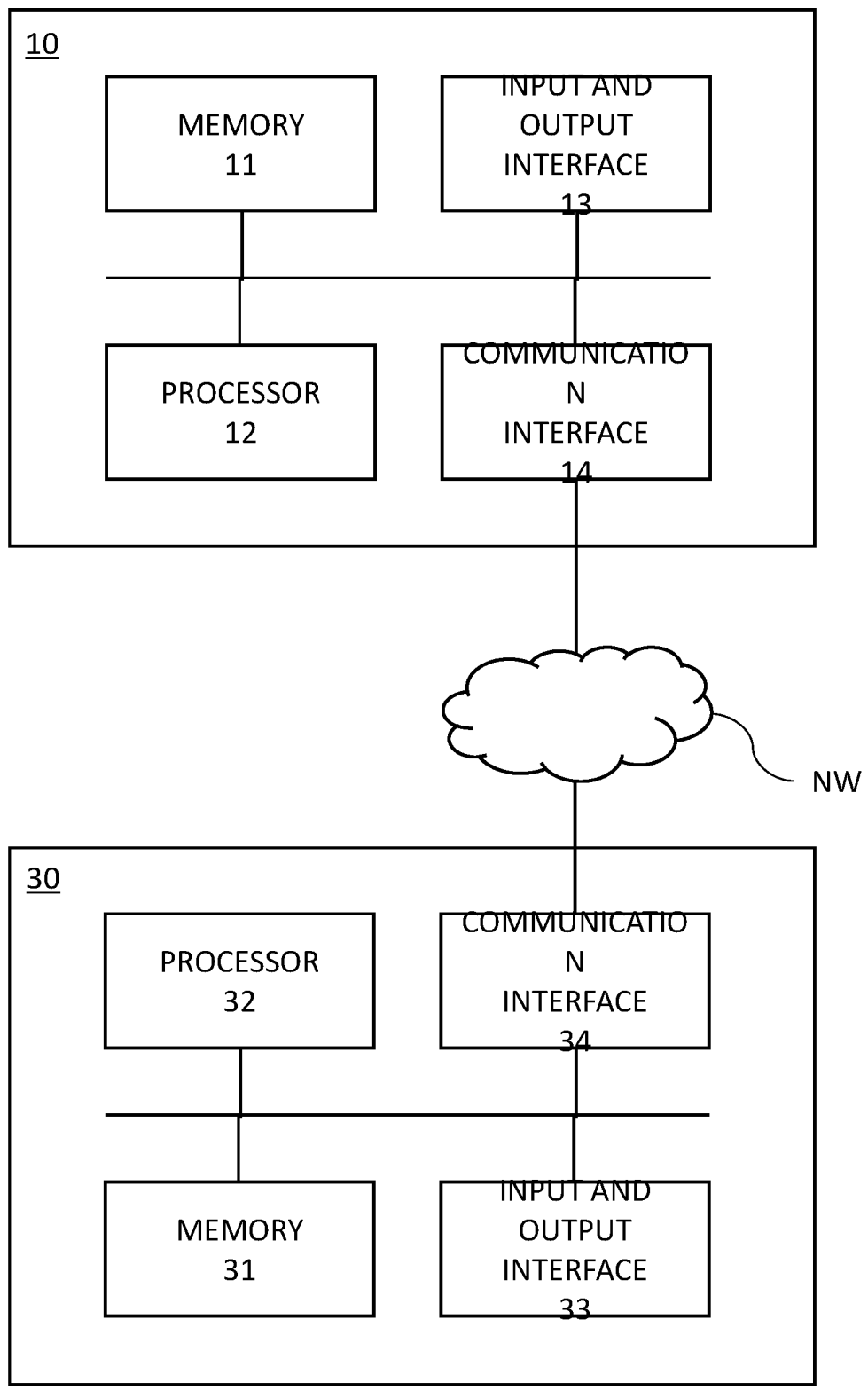
FIG. 1 is a block diagram showing a configuration of an information processing system according to the present embodiment.

Hereinafter, an embodiment of the present invention will be described in detail based on the drawings.

Note that, in the drawings for describing the embodiments, the same components are denoted by the same reference sign in principle, and the repetitive description thereof is omitted.

(1) Configuration of Information Processing System

The configuration of the information processing system will be described.

FIG. 1 is a block diagram showing the configuration of the information processing system according to the present embodiment.

As shown in FIG. 1, the information processing system 1 includes a client apparatus 10 and a server 30.

The client apparatus 10 and the server 30 are connected via a network (for example, the Internet or an intranet) NW.

The client apparatus 10 is an example of an information processing apparatus that transmits a request to the server 30.

The client apparatus 10 is, for example, a smartphone, a tablet terminal, or a personal computer.

The server 30 is an example of an information processing apparatus that provides the client apparatus 10 with a response in response to a request transmitted from the client apparatus 10.

The server 30 is, for example, a web server.

(1-1) Configuration of Client Apparatus

The configuration of the client apparatus 10 will be described.

As shown in FIG. 1, the client apparatus 10 includes a memory 11, a processor 12, an input and output interface 13, and a communication interface 14.

The memory 11 is configured to store a program and data.

The memory 11 is, for example, a combination of a ROM (read only memory), a RAM (random access memory), and a storage (for example, a flash memory or a hard disk).

The program includes, for example, the following program:
OS (Operating System) program; and
application program (for example, web browser) executing an information processing.

The data includes, for example, the following data:
database referenced in information processing; and
data obtained by executing an information processing (that is, an execution result of the information processing).

The processor 12 is configured to realize the function of the client apparatus 10 by activating the program stored in the memory 11.

The processor 12 is an example of a computer.

The input and output interface 13 is configured to retrieve a user's instruction from an input device connected to the client apparatus 10 and output information to an output device connected to the client apparatus 10.

The input device is, for example, a keyboard, a pointing device, a touch panel, or a combination thereof.

The output device is, for example, a display.

The communication interface 14 is configured to control communication between the client apparatus 10 and the server 30.

(1-2) Server Configuration

The configuration of the server 30 will be described.

As shown in FIG. 1, the server 30 includes a memory 31, a processor 32, an input and output interface 33, and a communication interface 34.

The memory 31 is configured to store a program and data.

The memory 31 is, for example, a combination of ROM, RAM, and storage (for example, flash memory or hard disk).

The program includes, for example, the following program.
OS program; and
application program executing an information processing.

The data includes, for example, the following data:
database referenced in information processing; and
execution result of the information processing.

The processor 32 is configured to realize the function of the server 30 by activating the program stored in the memory 31.

The processor 32 is an example of a computer.

The input and output interface 33 is configured to retrieve a user's instruction from an input device connected to the server 30 and output information to an output device connected to the server 30.

The input device is, for example, a keyboard, a pointing device, a touch panel, or a combination thereof.

The output device is, for example, a display.

The communication interface 34 is configured to control communication between the server 30 and the client apparatus 10.

(2) Summary of the Embodiment

The summary of the present embodiment will be described.

Figure 2:
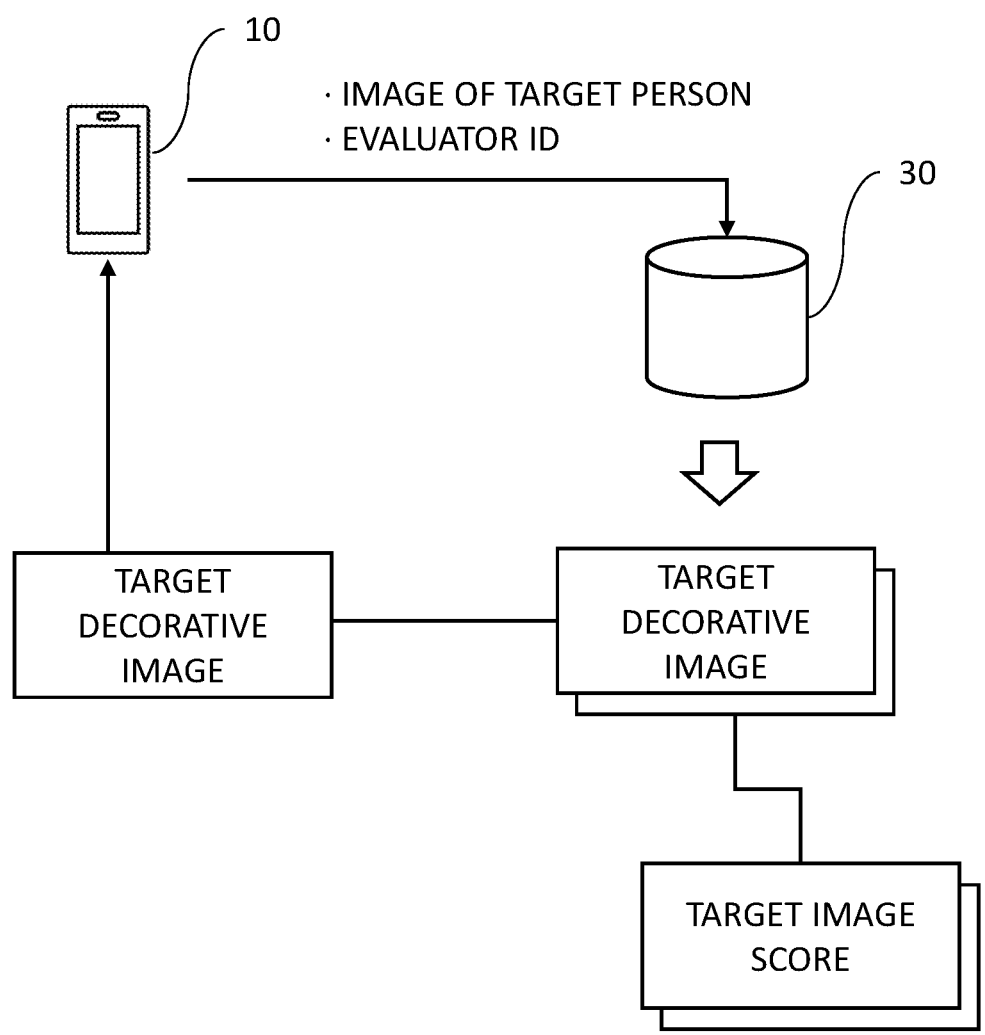
FIG. 2 is an explanatory diagram of summary of the present embodiment.

FIG. 2 is an explanatory diagram of summary of the present embodiment.

As shown in FIG. 2, the server 30 receives an image of target person to be decorated and at least one evaluator ID that identifies an evaluator different from the target person via the client apparatus 10.

The server 30 generates a plurality of target decoration images in which the target person's image is decorated.

The server 30 stores a plurality of reference decoration images in which images of a plurality of persons are decorated, a reference image score regarding evaluation by the evaluator for each reference decoration image, and evaluator ID of the evaluator who evaluates the reference decoration image associated with each other.

The server 30 calculates the target image score for the evaluation of each target decoration image based on the reference image score associated with the received evaluator ID among the plurality of reference image scores.

The server 30 presents at least one target decoration image whose target image score satisfies a predetermined condition among the plurality of target decoration images via the client apparatus 10.

According to this embodiment, it is possible to present a simulation result that matches the physical characteristics of the user and reflects the preference of the user.

(3) Database

The database of the present embodiment will be described.

The following database is stored in the memory 31.

(3-1) User Information Database

The user information database of the present embodiment will be described.

FIG. 3 is a diagram showing a data structure of the user information database of the present embodiment.

The user information database of FIG. 3 stores user information regarding the user.

The user information database includes a "USER ID" field, a "USER NAME" field, and a "USER ATTRIBUTE" field.

Each field is associated with each other.

The "USER ID" field stores user ID.

The USER ID is an example of user identification information that identifies a user.

The "USER NAME" field stores information regarding the username (for example, text).

The "USER ATTRIBUTE" field stores user attribute information regarding the user's attribute.

The "USER ATTRIBUTE" field includes a plurality of subfields ("GENDAR" field and "AGE" field).

The "GENDAR" field stores information regarding the user's gendar.

The "AGE" field stores information regarding the user's age.

(3-2) Makeup Pattern Information Database

The makeup pattern information database of the present embodiment will be described.

FIG. 4 is a diagram showing a data structure of the makeup pattern information database of the present embodiment.

The makeup PATTERN information database of FIG. 4 stores makeup pattern information regarding makeup patterns for generating makeup simulation image.

The makeup pattern information database includes a "MAKEUP PATTERN ID" field, a "MAKEUP PATTERN IMAGE" field, a "MAKEUP TASTE" field, a "TARGET GENDAR" field, a "TARGET AGE" field, and a "COSMETIC INFORMATION" field.

Each field is associated with each other.

The "MAKEUP PATTERN ID" field stores makeup pattern ID.

The makeup pattern ID is an example of makeup pattern identification information for identifying a makeup pattern.

The "MAKEUP PATTERN IMAGE" field stores a makeup pattern image data.

The makeup PATTERN image data is referred to for generating a makeup simulation image.

The "MAKEUP TASTE" field stores information regarding the taste of the makeup pattern.

The "TARGET GENDAR" field stores information regarding the target gendar of the makeup pattern.

The "TARGET AGE" field stores information regarding the target age of the makeup pattern.

The "COSMETIC INFORMATION" field stores information regarding cosmetics for makeup related to the makeup pattern image (for example, a text including a cosmetic name).

(3-3) Evaluator Information Database

The evaluator information database of the present embodiment will be described.

FIG. 5 is a diagram showing a data structure of the evaluator information database of the present embodiment.

The evaluator information database of FIG. 5 stores evaluator information regarding the evaluator.

The evaluator information database includes an "EVALUATOR ID" field, an "EVALUATOR NAME" field, and an "EVALUATOR ATTRIBUTE" field.

Each field is associated with each other.

The evaluator includes, for example, at least one of the following:
  makeup professional (hereinafter referred to as "makeup artist")
  non-professional makeup people (for example, general consumers)

The "EVALUATOR ID" field stores the evaluator ID.

The evaluator ID is an example of evaluator identification information that identifies the evaluator.

The "EVALUATOR NAME" field stores information regarding the evaluator name (for example, text).

The "EVALUATOR ATTRIBUTE" field stores evaluator attribute information regarding the evaluator's attributes.

The "EVALUATOR ATTRIBUTE" field includes a plurality of subfields ("GENDAR" field, "AGE" field, and "SKILL" field).

The "GENDAR" field stores information regarding the evaluator's gendar.

The "AGE" field stores information regarding the age of the evaluator.

The "SKILL" field stores information regarding the evaluator's makeup skills.

For example, "makeup artist" means having professional-level makeup skills.

"general" means having general consumer-level makeup skills.

(3-4) Reference Image Information Database

The reference image information database of the present embodiment will be described.

FIG. 6 is a diagram showing a data structure of the reference image information database of the present embodiment.

The reference image information database of FIG. 6 stores reference image information regarding evaluation of the reference makeup image.

The reference image information database includes a "REFERENCE IMAGE ID" field, a "REFERENCE REAL FACE IMAGE" field, a "REFERENCE MAKEUP IMAGE" field, and a "REFERENCE IMAGE SCORE" field.

Each field is associated with each other.

The reference image information database is associated with the evaluator ID.

The "REFERENCE IMAGE ID" field stores reference image ID.

The "REFERENCE REAL FACE IMAGE" field stores image data of a real face image of a person.

The "REFERENCE REAL FACE IMAGE" field of one record includes the real face image of one person.

The "REFERENCE MAKEUP IMAGE" field stores image data of the reference makeup image in which the makeup is applied to the real face of the person.

The image data of the reference makeup image may be the one in which the makeup is actually applied to the real face of the person, or the one generated by the makeup simulation.

The "REFERENCE IMAGE SCORE" field stores information (for example, score) regarding the evaluation of the reference makeup image by the evaluator.

(4) Information Processing

Information processing of the present embodiment will be described.

Figure 7:
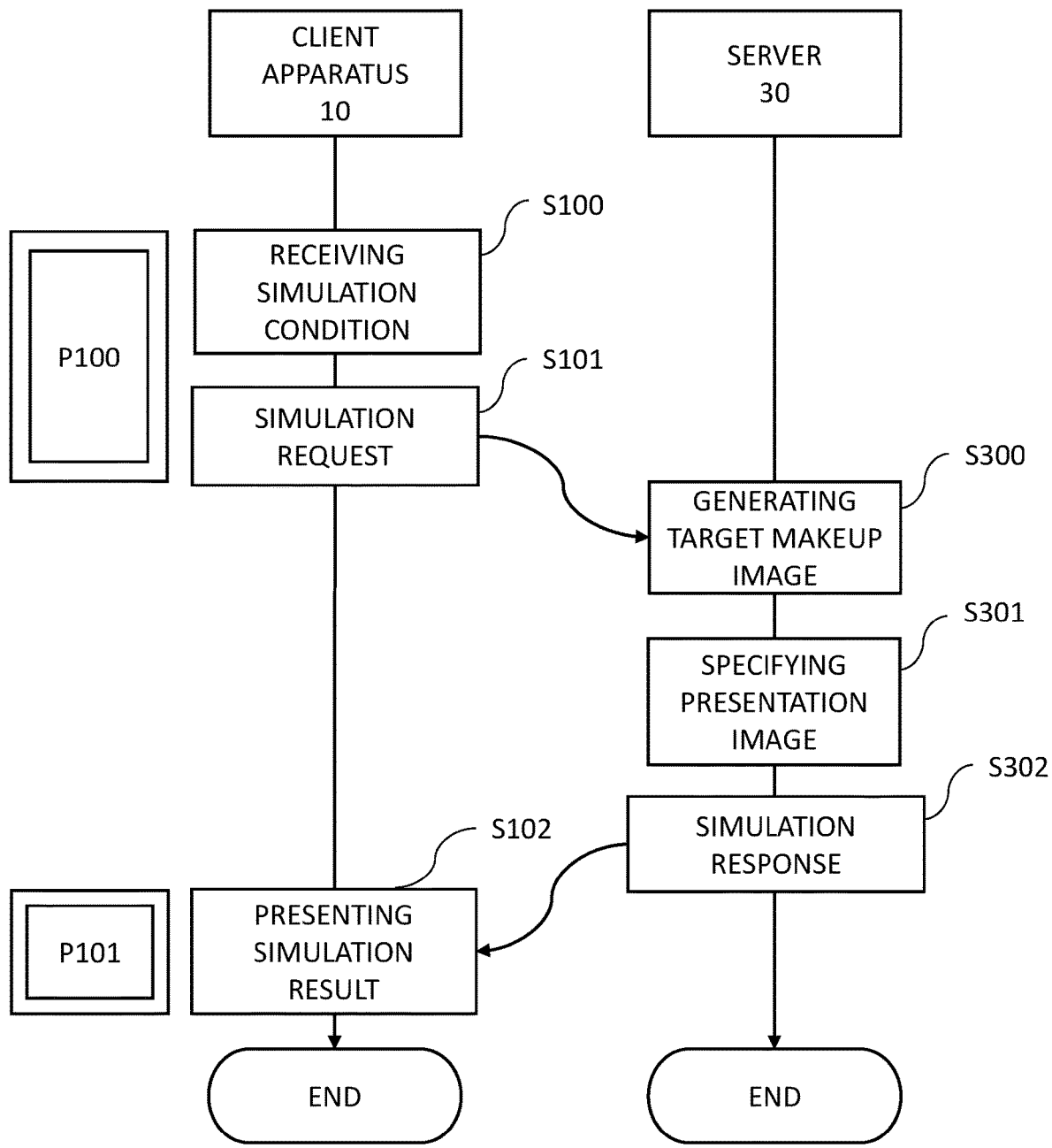
FIG. 7 is a sequence diagram of makeup simulation processing of the present embodiment.

FIG. 7 is a sequence diagram of the makeup simulation processing of the present embodiment.

FIG. 8 is a diagram showing an example of a screen displayed in the information processing of FIG. 7.

The user of the client apparatus 10 is the target person of the makeup simulation.

As shown in FIG. 7, the client apparatus 10 executes receiving simulation condition (S100).

Specifically, the processor 12 displays the screen P100 (FIG. 8) on the display.

The screen P100 includes field objects F100a to F100b and operation objects B100.

The field object F100a is an object that receives a user instruction for designating an image of the real face of the target person to be the target of the makeup simulation (hereinafter referred to as "target real face image").

The field object F100b is an object that receives a user instruction for designating an evaluator of the makeup simulation.

The operation object B100 is an object that receives a user instruction for transmitting the user instruction input to the field objects F100a to F100b to the server 30.

After the step S100, the client apparatus 10 executes simulation request (S101).

Specifically, when the user designates the image data of the image of the user's face in the field object F100a, and the evaluator information (for example, the evaluator name or the evaluator attribute) of at least one evaluator in the makeup simulation in the field object F100b, and operates the operation object B100, the processor 12 transmits the simulation request data to the server 30.

The simulation request data includes the following information:
  user ID of the target person (hereinafter referred to as "target user ID");
  image data of the target real face image designated in the field object F100a;
  and
  evaluator information designated in the field object F100b.

After the step S101, the server 30 executes generating target makeup image (S300).

Specifically, the processor 32 refers to the makeup pattern information database (FIG. 4) and superimposes each makeup pattern image on the target real face image to generate a target makeup image corresponding to each makeup pattern image.

After the step S300, the server 30 executes specifying presentation image (S301).

Specifically, the processor 32 refers to the evaluator information database (FIG. 5) and specifies at least one evaluator ID associated with the evaluator information included in the simulation request data.

The processor 32 refers to the reference image information database (FIG. 6) and specifies the image data and the reference image score of the reference makeup image associated with the evaluator ID.

The processor 32 calculates the target image score corresponding to each target makeup image generated in the step S300.

As an example, the processor 32 applies the target makeup image to the calculation model G1 (x) stored in the memory 31 to calculate the target image score S1.

The calculation model G1 (x) is a function that includes all the specified reference makeup images and the reference image score associated with each reference makeup image as parameters.

$$S1 = G1(x) \quad \text{(Equation 1)}$$

S1: target image score
G1 (x): calculation model
X=target makeup image

That is, one target makeup image is compared with all the specified reference makeup images, and the target image score of one target makeup image is calculated based on each reference image score.

The calculation of target image score is performed on all the target makeup images generated in the step S300.

The processor 32 specifies at least one target makeup image whose target image score calculated above satisfies a predetermined condition among the plurality of target makeup images generated in the step S300 as a presentation image to be presented to the user.

Any of the following can be mentioned as a predetermined condition:
  the target image score is equal to or higher than the predetermined value; and
  the target image score is under the predetermined ranking.

After the step S301, the server 30 executes simulation response (S302).

Specifically, the processor 32 transmits simulation response data to the client apparatus 10.

The simulation response data includes the following information:
  the image data of the target makeup image specified in the step S301.

After the step S302, the client apparatus 10 executes presenting simulation result (S102).

Specifically, the processor 12 displays the screen P101 (FIG. 8) on the display based on the simulation response data.

The screen P101 includes the display object A101.

The display object A101 includes a target makeup image corresponding to the image data included in the simulation response data (that is, a target makeup image whose target image score satisfies a predetermined condition).

According to the present embodiment, when the user inputs an image of one's own real face image and the desired evaluator information, a simulation result that matches the physical characteristics (face characteristics) of the target person and reflects the sensibility of the evaluator may be presented.

Since the evaluator is specified by the user, the simulation result reflects the user's preference.

In particular, when the user designates a specific makeup artist as an evaluator, the simulation result corresponding to the individuality of the makeup artist may be presented.

In addition, for users who are sensitive to fashion trend, since the evaluators include the general public, it is possible to present simulation results that reflect the fashion trend.

(5) Variation

Variations of the present embodiment will be described.

(5-1) First Variation

First variation will be described.

First variation is an example of receiving the designation of the reference image score from the evaluator for the generated target makeup image.

Here, an example of also receiving the designation of the reference image score from the target person (user) for the presented target makeup image will be described.

(5-1-1) Image Generation Log Information Database

The image generation log information database of the first variation will be described.

FIG. 9 is a diagram showing a data structure of the image generation log information database of the first variation.

The image generation log information database of FIG. 9 stores image generation log information regarding the history of execution results of generating target makeup image.

The image generation log information database includes an "IMAGE GENERATION LOG ID" field, a "TARGET REAL FACE IMAGE" field, a "TARGET MAKEUP IMAGE" field, and a "REFERENCE IMAGE SCORE" field.

Each field is associated with each other.

The image generation log information database is associated with the user ID.

The "IMAGE GENERATION LOG ID" field stores image generation log ID that identifies the image generation log information.

The image generation log ID is an example of image generation log identification information that identifies the image generation log.

The "TARGET REAL FACE IMAGE" field stores image data of the target real face image.

The "TARGET MAKEUP IMAGE" field stores image data of target makeup image.

The "REFERENCE IMAGE SCORE" field stores information (for example, a score) regarding the user's evaluation of the target makeup image.

(5-1-2) Information Processing

The information processing of the first variation will be described.

(5-1-2-1) Makeup Simulation Processing

The makeup simulation processing of the first variation will be described.

Figure 10:
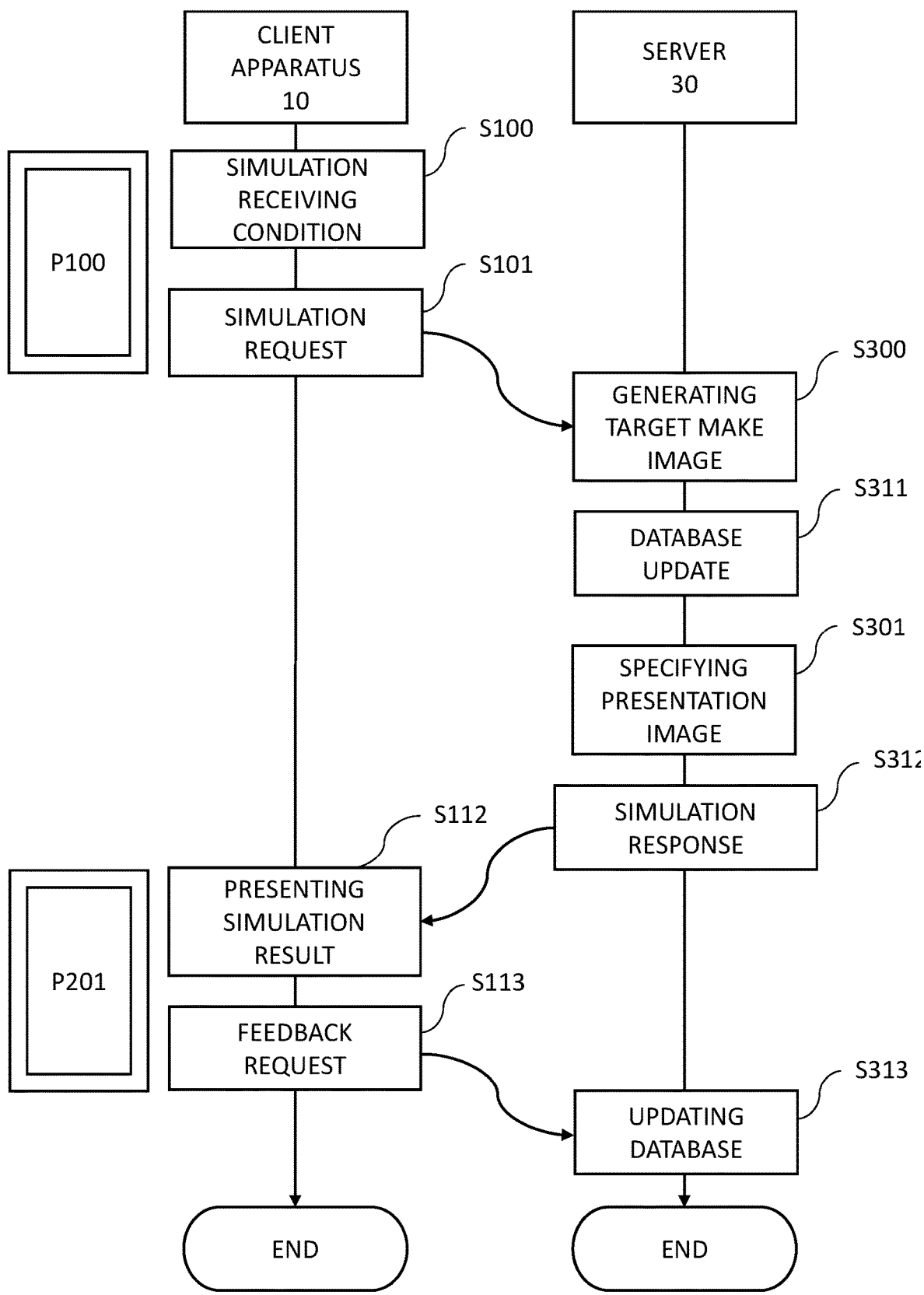
FIG. 10 is a sequence diagram of a makeup simulation processing of the first variation.

FIG. 10 is a sequence diagram of the makeup simulation processing of the first variation.

Figure 11:
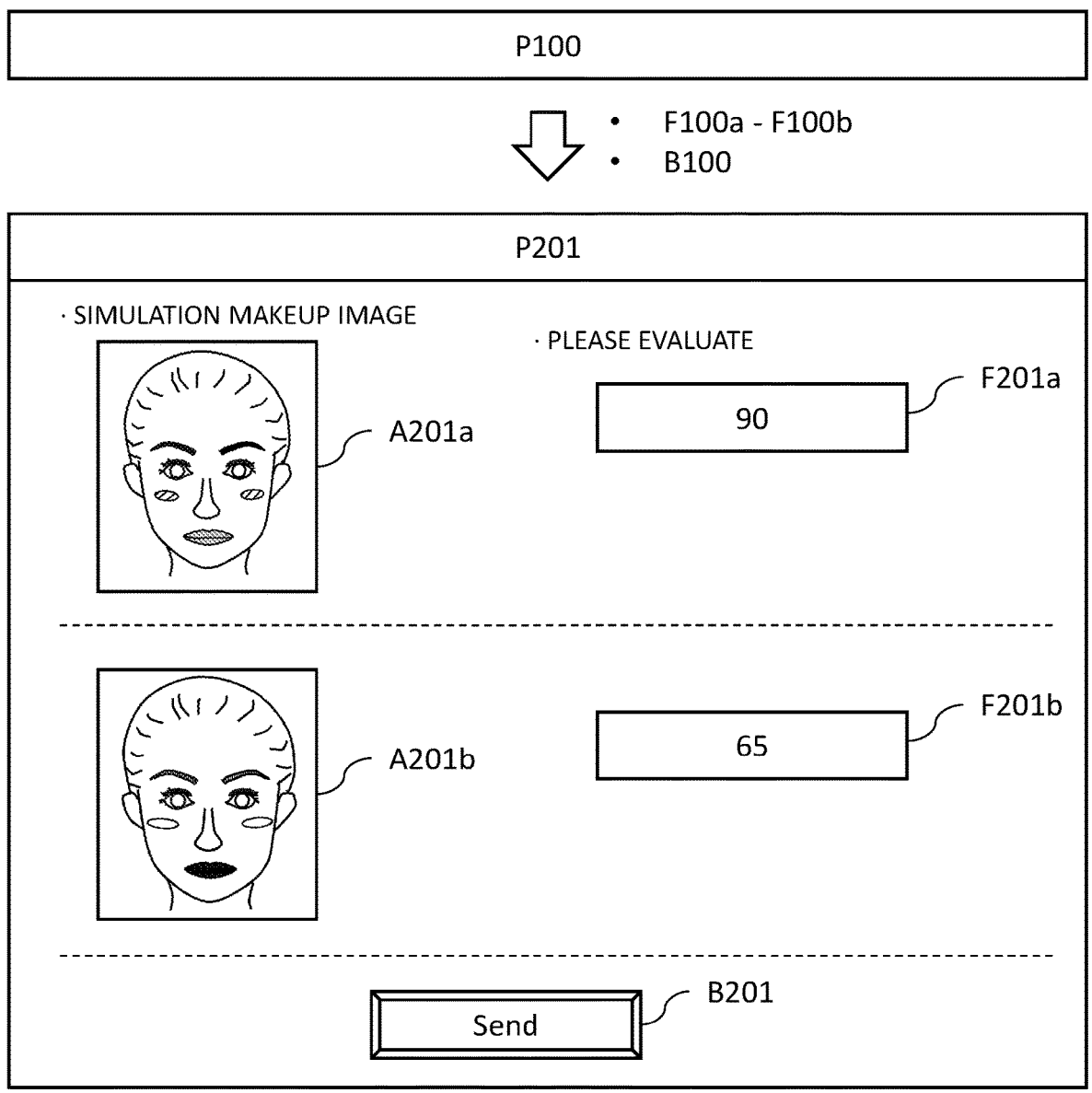
FIG. 11 is a diagram showing an example of a screen displayed in the information processing of FIG. 10.

FIG. 11 is a diagram showing an example of a screen displayed in the information processing of FIG.

The user of the client apparatus 10 in FIG. 10 is a target person of the makeup simulation.

As shown in FIG. 10, the client apparatus 10 executes the steps S100 to S101 in the same manner as in FIG. 7.

After the step S101, the server 30 executes the step S300 in the same manner as in FIG. 7.

After the step S300, the server 31 executes updating database (S311).

Specifically, the processor 32 adds a new record to the image generation log information database (FIG. 9) associated with the target USER ID included in the simulation request data.

The following information is stored in each field of the new record:
  new image generation log ID is stored in the "IMAGE GENERATION LOG ID" field;
  the image data of target real face image included in the simulation request data is stored in the "TARGET REAL FACE IMAGE" field; and
  the image data of target makeup image generated in the step S300 is stored in the "TARGET MAKEUP IMAGE" field.

After the step S311 the server 30 executes the step S301 in the same manner as in FIG. 7.

After the step S301, the server 30 executes the simulation response (S312).

Specifically, the processor 32 transmits the simulation response data to the client apparatus 10.

The simulation response data includes the following information:
  the image date of the target makeup image specified in the step S301; and
  the image generation log ID of the target makeup image specified in the step S301.

After the step S312, the client apparatus 10 executes presenting simulation result (S112).

Specifically, the processor 12 displays the screen P201 (FIG. 11) on the display based on the simulation response data.

The screen P201 includes one or more display objects A201, one or more field objects F201, and an operation object B201.

The number of each of the display object A201 and the field object F201 is the same as the number of target makeup images specified in the step S301.

For example, when the number of the target image is two, the screen P201 includes two display objects A201 (A201a, A201b) and two field objects F201 (F201a, F201b).

Each display object A201 includes a target makeup image corresponding to the image data included in the simulation response data (that is, a target makeup image whose target image score satisfies a predetermined condition).

Each display object A201 is a simulation result.

Each field object F201 is an object that receives the designation of the reference image score regarding the evaluation by the user for the target makeup image.

The operation object B201 is an object that receives a user instruction for transmitting the user instruction input to the field object F201 to the server 30.

After the step S112, the client apparatus 10 executes feedback request (S113).

Specifically, when the user inputs the evaluation score (reference image score) for the target makeup image displayed on the display object A201 into the field object F201 and operates the operation object B201, the processor 12 transmits the feedback request data to the server 30.

The feedback request data includes the following information:
  target user ID;
  reference image score; and
  image generation log ID.

After the step S113, the server 31 executes updating database (S313).

Specifically, the processor 32 stores the reference image score included in the feedback request data in the "REFERENCE IMAGE SCORE" field of the image generation log information database (FIG. 9) associated with the target user ID included in the feedback request data.

(5-1-2-2) Evaluator Feedback Processing

The evaluator feedback processing of the first variation will be described.

Figure 12:
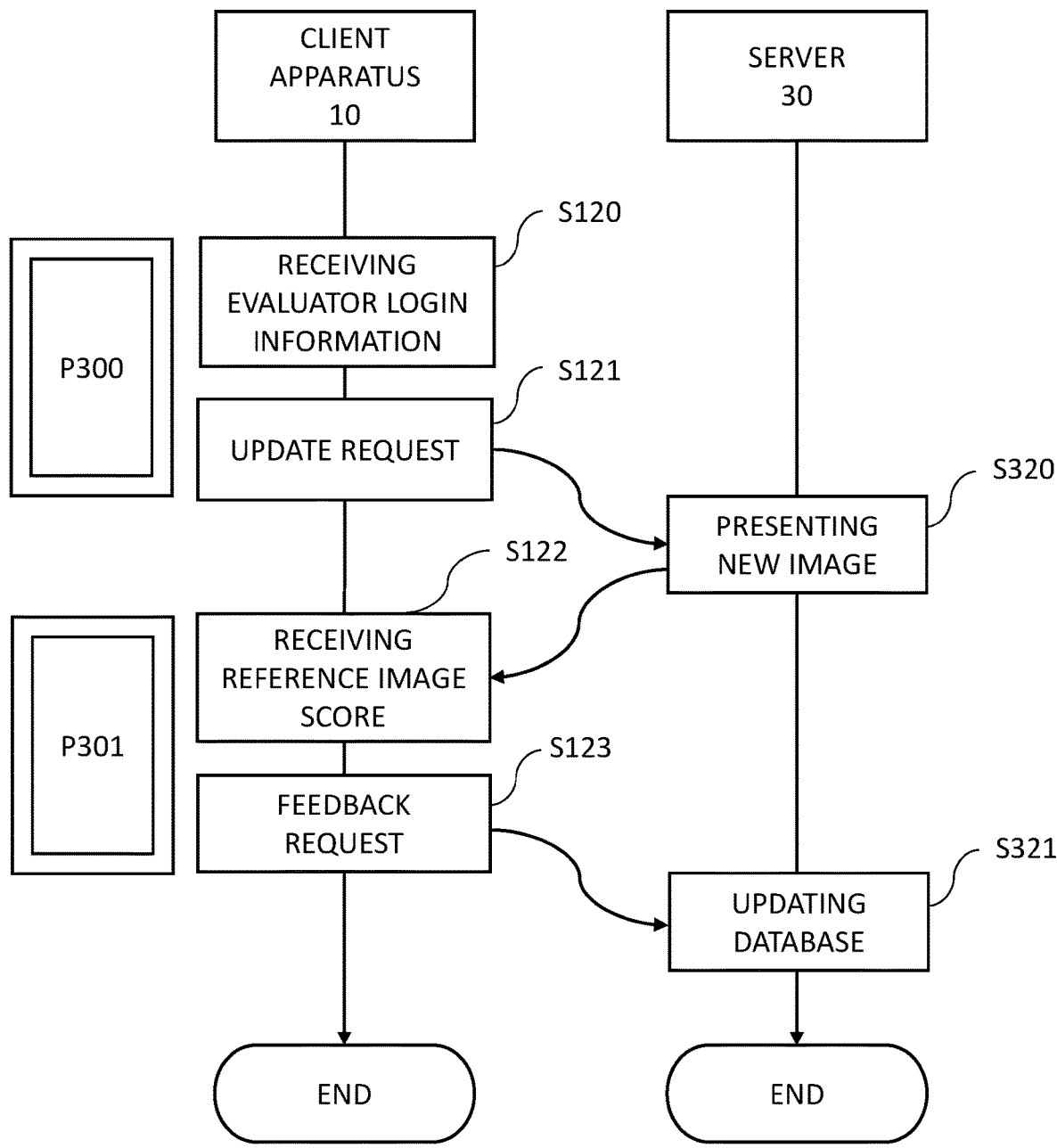
FIG. 12 is a sequence diagram of an evaluator feedback processing of the first variation.

FIG. 12 is a sequence diagram of the evaluator feedback processing of the first variation.

Figure 13:
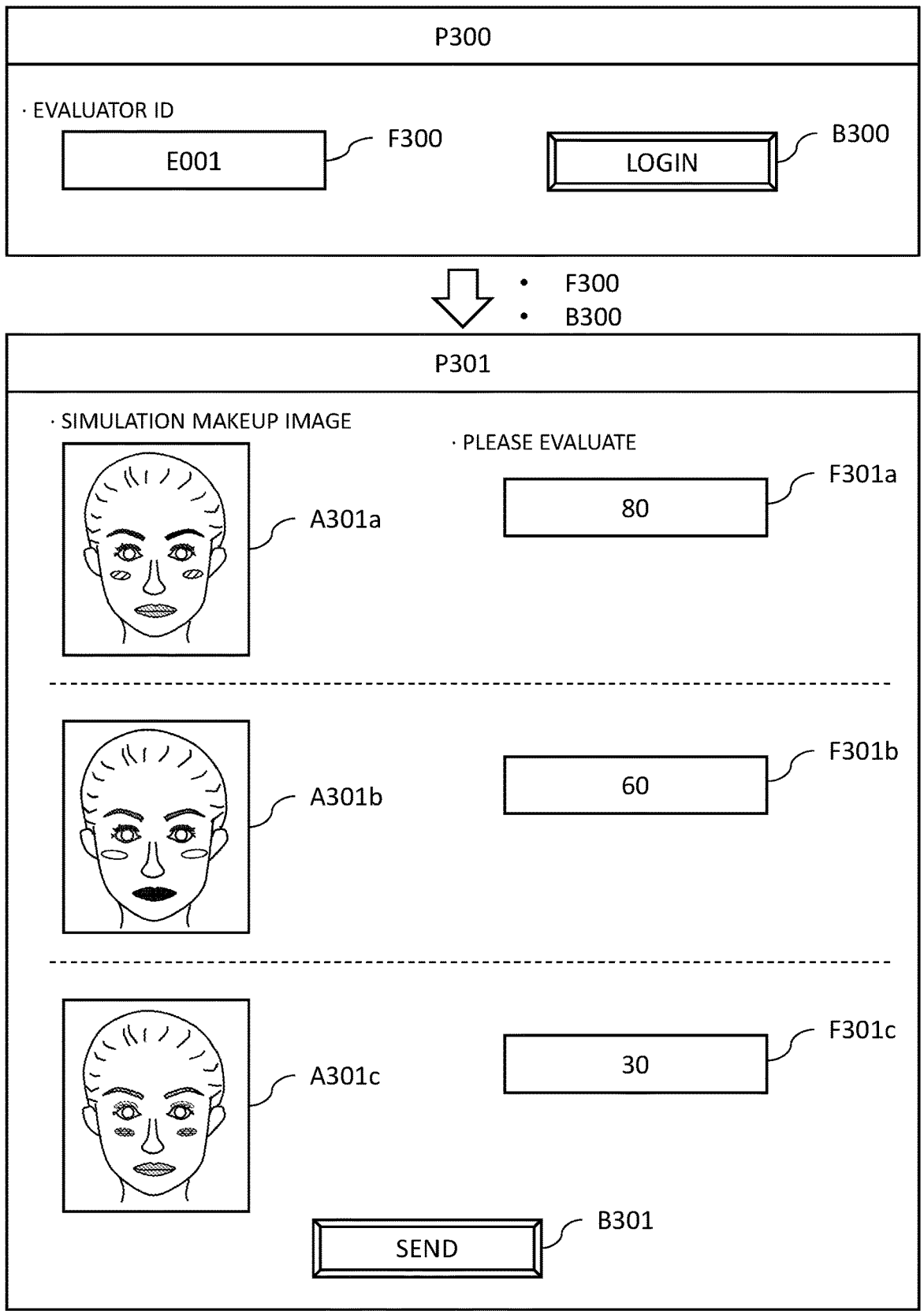
FIG. 13 is a diagram showing an example of a screen displayed in the information processing of FIG. 12.

FIG. 13 is a diagram showing an example of a screen displayed in the information processing of FIG.

The user of the client apparatus 10 in FIG. 12 is an evaluator.

The client apparatus 10 executes the receiving evaluator login information (S120).

Specifically, the processor 12 displays the screen P300 (FIG. 13) on the display.

The screen P300 includes a field object F300 and an operation object B300.

The field object F300 is an object that receives a user instruction for designating an evaluator ID.

The operation object B300 is an object that receives a user instruction for transmitting the user instruction input to the field object F300 to the server 30.

After the step S120, the client apparatus 10 executes update request (S121).

Specifically, when the evaluator designates the evaluator's evaluator ID into the field object F300 and operates the operation object B300, the processor 12 transmits the update request data to the server 30.

The update request data includes the following information:

evaluator ID of the evaluator.

The evaluator may be an evaluator designated by the user in the step S100, or may be an evaluator not designated by the user in the step S100.

After the step S121, the server 30 executes presenting new image (S320).

Specifically, the processor 32 identifies a target makeup image that has not yet been evaluated by the evaluator based on the image generation log information database (FIG. 9) and the reference image information database (FIG. 6).

The processor 32 refers to the image generation log information database (FIG. 9) and transmits the evaluation request data to the client apparatus 10.

The evaluation request data includes the following information:
 image generation log ID;
 image date of the image real face image; and
 image date of the target makeup image.

The target makeup images that the evaluator has not yet evaluated may include the target makeup image presented in the step S112 (that is, the target makeup image whose target image score calculated in the step S301 satisfies a predetermined condition) and the target makeup image not presented in the step S112 (that is, the target makeup image whose target image score calculated in the step S301 does not satisfy the predetermined condition).

After the step S320, the client apparatus 10 executes receiving reference image score (S122).

Specifically, the processor 12 displays the screen P301 (FIG. 13) on the display based on the evaluation request data.

The screen P301 includes one or more display objects A301, one or more field objects F301, and an operation object B301.

The number of each of the display object A301 and the field object F301 is the same as the number of target makeup images specified in the step S320.

For example, when the number of the target makeup images is three, the screen P301 includes three display objects A301 (A301a, A301b, A301c) and three field objects F301 (F301a, F301b, F301c).

Each display object A301 includes a target makeup image corresponding to the image data included in the evaluation request data (that is, a target makeup image that the evaluator has not yet evaluated).

Each display object A301 may further include a corresponding target real face image.

Each field object F301 is an object that receives the designation of the reference image score regarding the evaluation by the evaluator for the target makeup image.

The operation object B301 is an object that receives a user instruction for transmitting the user instruction input to the field object F301 to the server 30.

After the step S122, the client apparatus 10 executes feedback request (S123).

Specifically, when the evaluator inputs the evaluation score (reference image score) for the target makeup image displayed on the display object A301 into the field object F301 and operates the operation object B301, the processor 12 transmits feedback request data to the server 30.

The feedback request data includes the following information:
 evaluator ID;
 reference image score; and
 image generation log ID.

After the step S123, the server 32 executes updating database (S321).

Specifically, the processor 32 adds a new record to the reference image information database (FIG. 6) associated with the evaluator ID included in the feedback request data.

The following information is stored in each field of the new record:
 the image generation log ID included in the feedback request data is stored in the "REFERENCE IMAGE ID" field;
 the image data of the target real face image associated with the image generation log ID is stored in the "REFERENCE REAL FACE IMAGE" field;
 the image data of the target makeup image associated with the image generation log ID is stored in the "REFERENCE MAKEUP IMAGE" field; and
 the reference image score included in the feedback request data is stored in the "REFERENCE IMAGE SCORE" field.

As described above, in the first variation, the reference image score from the evaluator for the target makeup image generated in the step S300 is stored.

As a result, in the subsequent simulations, the target image score is calculated in consideration of the content of the feedback by the evaluator. Therefore, it is possible to present the simulation result corresponding to the evaluator's unique sensibility (individuality).

Further, in the first variation, the reference image score from the user for the target makeup image presented in the step S112 is stored.

As a result, in the subsequent simulations, when the user includes the user himself or herself as the evaluator designated in the step S100, the target image score is calculated in consideration of the content of the feedback by the user. Therefore, it is possible to present the simulation result more corresponding to the user's preference.

(5-2) Second Variation

Second variation will be described.

Second variation is an example in which a target makeup image that reflects the generation conditions (user attributes, and user requests, or the like) specified by the user is generated.

(5-2-1) Information Processing

The information processing of the second variation will be described.

Figure 14:
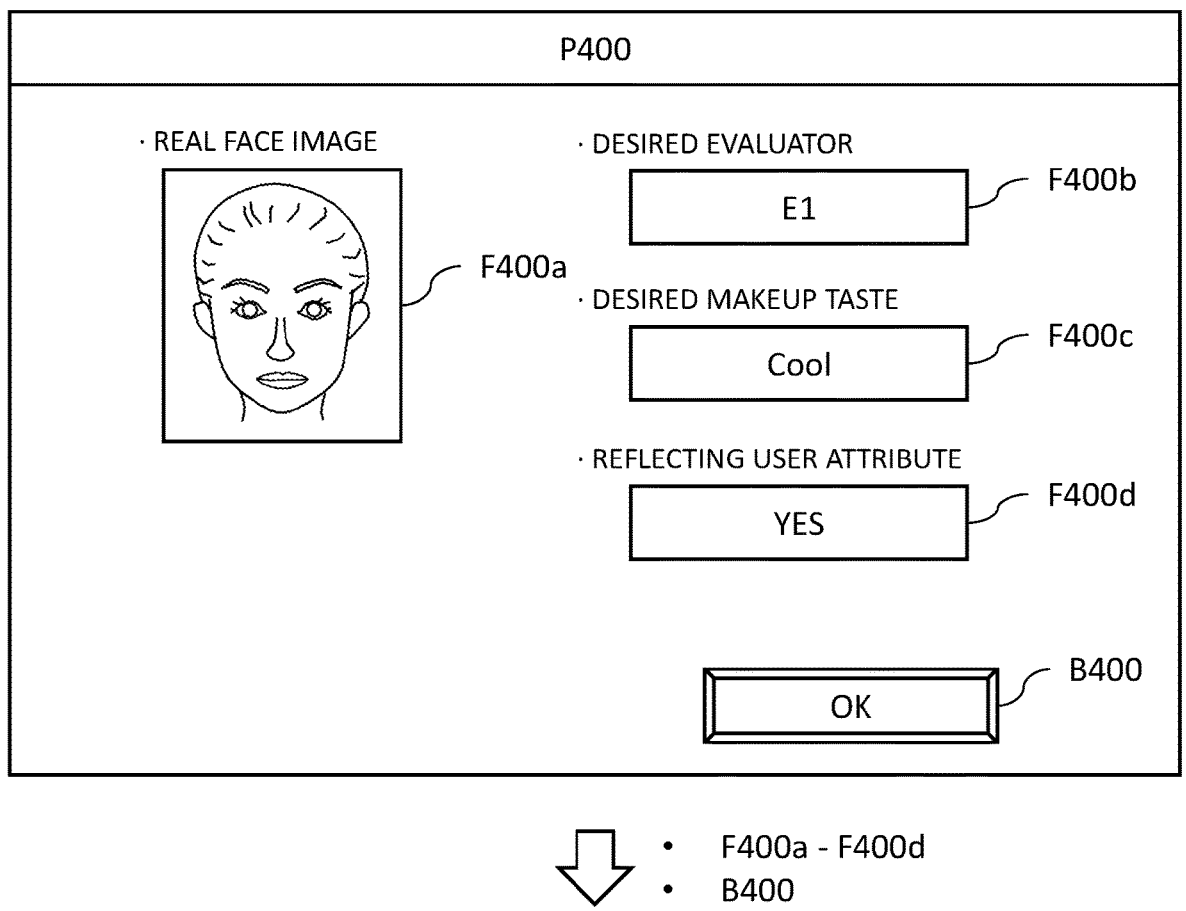
FIG. 14 is a diagram showing an example of a screen displayed in the information processing of the second variation.

FIG. 14 is a view showing an example of a screen displayed in the information processing of the second variation.

In the second variation, in the step S100 of FIG. 7, the processor 12 displays the screen P400 (FIG. 14) on the display.

The screen P400 includes field objects F400a to F400d and operation objects B400.

The field object F400a is an object that receives a user instruction for designating a target real face image.

The field object F400b is an object that receives a user instruction for designating an evaluator of the makeup simulation.

The field object F400c is an object that receives a user instruction for designating a makeup taste in the makeup simulation.

The field object F400d is an object that receives a user instruction for designating whether or not the user attribute is reflected in the makeup simulation.

The operation object B400 is an object that receives a user instruction for transmitting the user instruction input to the field objects F400a to F400d to the server 30.

After the step S100, the client apparatus 10 executes the simulation request (S101).

Specifically, the user designates the image data of the image of the user's real face in the field object F400a, the evaluator information (for example, the evaluator name or the evaluator attribute) of at least one evaluator in the makeup simulation in the field object F400b, the makeup taste in the makeup simulation in the field object F400c, whether the user attribute is considered or not in the makeup simulation in the field object F400d, and operates the operation object B400, the processor 12 transmits the simulation request data to the server 30.

The simulation request data includes the following information:
- target user ID;
- the image data of the target real face image designated in the field object F400a;
- the evaluator information designated in the field object F400b;
- the make taste designated in the field object F400c; and
- whether the user attribute is considered or not designated in the field object F400d.

After the step S101, the server 30 executes generating target makeup image (S300).

Specifically, the processor 32 refers to the user information database (FIG. 3) and specifies a user attributes (gender and age) associated with the target user ID included in the simulation request data.

The processor 32 refers to the makeup pattern information database (FIG. 4) and specifies a plurality of makeup pattern images corresponding to the specified user attribute and the information regarding the make taste included in the simulation request data.

The processor 32 superimposes each of the specified makeup pattern images on the target real face image to generate the target makeup image corresponding to each makeup pattern image.

After the step S300, the server 30 executes the steps S301 to S302 in the same manner as in FIG. 7.

After the step S302, the client apparatus 10 executes the step S102 in the same manner as in FIG. 7.

As described above, in the second variation, the target makeup image corresponding to the generation conditions (user attributes, and user requests, or the like) designated by the user is generated.

Therefore, it is possible to present the user with a simulation result that matches the attributes and preferences of the user.

(5-3) Third Variation

Third variation will be described.

The third variation is an example of presenting cosmetic information regarding cosmetics corresponding to the presented target makeup image.

(5-3-1) Image Generation Log Information Database

The image generation log information database of the third variation will be described.

FIG. 15 is a diagram showing a data structure of the image generation log information database of the third variation.

The image generation log information database of FIG. 15 stores image generation log information regarding the history of execution results of generating target makeup image.

The image generation log information database includes an "IMAGE GENERATION LOG ID" field, a "TARGET REAL FACE IMAGE" field, a "TARGET MAKEUP IMAGE" field, and a "COSMETIC INFORMATION" field. Each field is associated with each other.

The image generation log information database is associated with the user ID.

The "IMAGE GENERATION LOG ID" field, the "TARGET REAL FACE IMAGE" field, and the "TARGET MAKEUP IMAGE" field are the same as those described in FIG. 9.

The "COSMETIC INFORMATION" field stores information regarding cosmetics (for example, text including the cosmetic name) associated with the makeup pattern image used in the simulation.

(5-3-2) Information Processing

The information processing of the third variation will be described.

Figure 16:
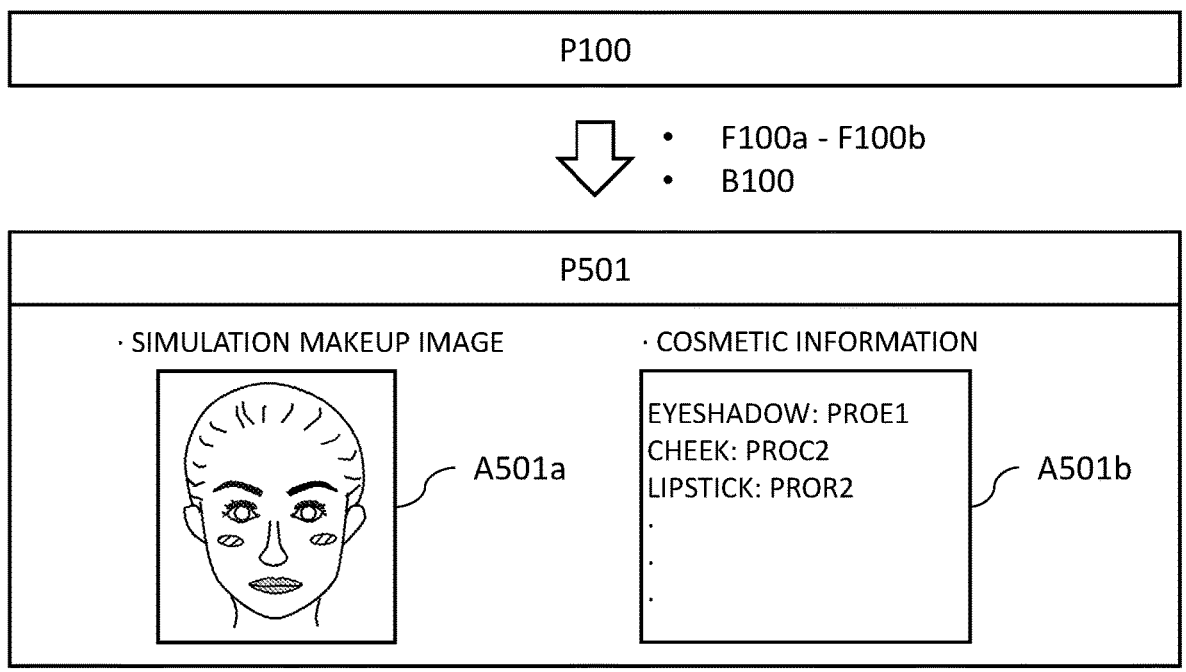
FIG. 16 is a diagram showing an example of a screen displayed in the information processing of the third variation.

FIG. 16 is a view showing an example of a screen displayed in the information processing of third variation.

The client apparatus 10 executes the steps S100 to S101 in the same manner as in FIG. 7.

After the step S101, the server 30 executes the generating target makeup image (S300).

Specifically, the processor 32 refers to the makeup pattern information database (FIG. 4), superimposes each makeup pattern image on the target real face image to generate the target makeup image corresponding to each makeup pattern image.

The processor 32 adds a new record to the image generation log information database (FIG. 15) associated with the target user ID included in the simulation request data.

The following information is stored in each field of the new record:
- new image generation log ID is stored in the "IMAGE GENERATION LOG ID" field;
- the image data of the target real face image included in the simulation request data is stored in the "TARGET REAL FACE IMAGE" field;
- the image data of the target makeup image generated in the step S300 is stored in the "TARGET MAKEUP IMAGE" field; and
- the cosmetic information associated with the makeup pattern image corresponding to the image data of target makeup image generated in the step S300 is stored.

After the step S300, the server 30 executes specifying presentation image (S301).

Specifically, as in FIG. 7, the processor 32 specifies at least one target makeup image in which the target image score calculated in the step S301 satisfies a predetermined condition among the plurality of target makeup images generated in the step S300 as a presentation image to be presented to the user.

The processor 32 refers to the image generation log information database (FIG. 15) and specifies the cosmetic information corresponding to the specified target makeup image.

After the step S301, the server 30 executes simulation response (S302).

Specifically, the processor 32 transmits the simulation response data to the client apparatus 10.

The simulation response data includes the following information:
- the image data of the target makeup image specified in the step S301; and
- the cosmetic information specified in the step S301.

After the step S302, the client apparatus 10 executes presenting simulation result (S102).

Specifically, the processor 12 displays the screen P501 (FIG. 16) on the display based on the simulation response data.

The screen P501 includes display objects A501a to A501b.

The display object A501a includes the target makeup image corresponding to the image data included in the simulation response data (that is, a target makeup image whose target image score satisfies a predetermined condition).

The display object A501b includes cosmetic information included in the simulation response data.

As described above, in the third variation, the information regarding the cosmetics corresponding to the target makeup image is presented.

Therefore, it is possible for the user to know the cosmetics required to actually apply the presented target makeup image.

Therefore, the reproducibility of the makeup of the target makeup image by the user is improved.

(5-4) Fourth Variation

Fourth variation will be described.

The fourth variation is an example of generating a target comment text for the presented target makeup image.

(5-4-1) Candidate Comment Information Database

The candidate comment information database of the fourth variation will be described.

FIG. 17 is a diagram showing a data structure of the candidate comment information database of fourth variation.

The candidate comment information database of FIG. 17 stores candidate comment information regarding candidate comment text to be presented to the user.

The candidate comment information database includes a "CANDIDATE COMMENT ID" field and a "candidate COMMENT TEXT" field.

The "CANDIDATE COMMENT ID" field stores a candidate comment ID.

The "CANDIDATE COMMENT TEXT" field stores information (for example, text) regarding the candidate comment text to be presented to the user.

(5-4-2) Reference Comment Information Database

The reference comment information database of the fourth variation will be described.

FIG. 18 is a diagram showing a data structure of the reference comment information database of the fourth variation.

The reference comment information database of FIG. 18 stores reference comment information regarding the evaluation of the reference comment text.

The reference comment information database includes a "REFERENCE COMMENT ID" field, a "REFERENCE IMAGE ID" field, a "REFERENCE COMMENT TEXT" field, and a "REFERENCE COMMENT SCORE" field.

The reference image information database is associated with the evaluator ID.

The reference comment ID is stored in the "REFERENCE COMMENT ID" field.

The reference image ID (FIG. 6) is stored in the "REFERENCE IMAGE ID" field.

The "REFERENCE COMMENT TEXT" field stores information (for example, text) regarding the comment text for the reference makeup image associated with the reference image ID.

The "REFERENCE COMMENT SCORE" field stores information (for example, a score) regarding the evaluation of the reference comment text by the evaluator.

(5-4-3) Information Processing

The information processing of the fourth variation will be described.

Figure 19:
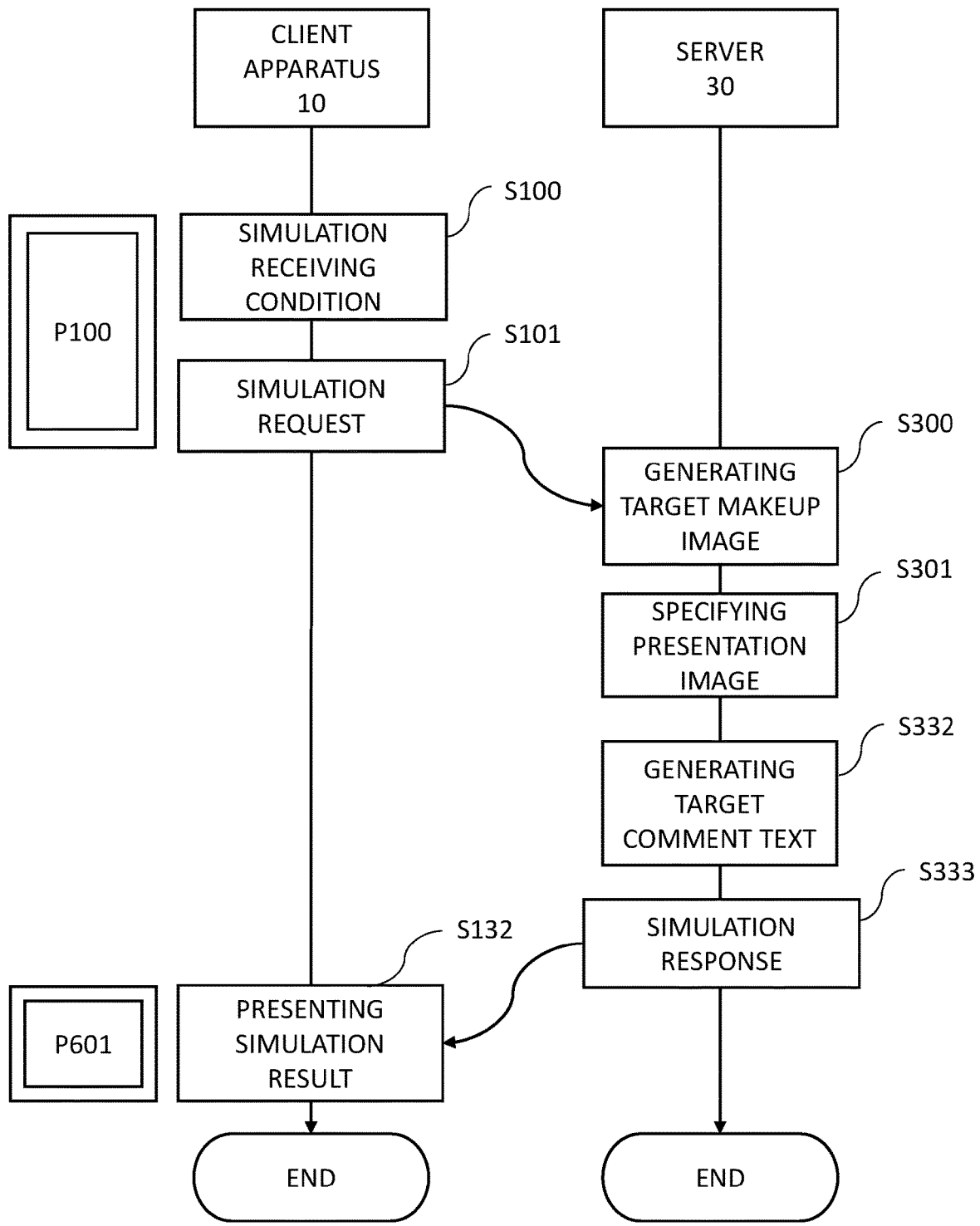
FIG. 19 is a sequence diagram of a makeup simulation processing of fourth variation.

FIG. 19 is a sequence diagram of the makeup simulation processing of the fourth variation.

FIG. 20 is a diagram showing an example of a screen displayed in the information processing of FIG. 19.

As shown in FIG. 19, the client apparatus 10 executes the steps S100 to S101 in the same manner as in FIG. 7.

After the step S101, the server 30 executes the steps S300 to S301 in the same manner as in FIG. 7.

After the step S301, the server 30 executes generating target comment text (S332).

Specifically, the processor 32 refers to the reference comment information database (FIG. 18), and specifies the reference image ID associated with the evaluator ID included in the simulation request data, the information of the reference comment text, and the reference comment score.

The processor 32 refers to the reference image information database (FIG. 6) and specifies the reference makeup image associated with the identified reference image ID.

The processor 32 calculates the target comment score regarding the evaluation for each candidate comment text stored in the candidate comment information database (FIG. 17).

As an example, the processor 32 calculates the target comment score S2 by applying the candidate comment text to the calculation model G2 ($x$) stored in the memory 31.

The calculation model G2 ($x$) is a function including all the specified reference makeup images, the target makeup image specified in the step S301, the reference comment text associated with each reference makeup image, and the reference comment score as parameters.

$$S2 = G2(x) \qquad \text{(Equation 2)}$$

S2: target comment score
G2 ($x$): calculation model
X=candidate comment text

That is, using all the reference makeup images associated with the reference image ID, the target makeup image specified in the step S301, the reference comment text, and the reference comment score, the target comment score for each candidate comment information stored in the candidate comment information database (FIG. 17).

The processor 32 specifies one candidate comment text (hereinafter referred to as "target comment text") having the highest target comment score calculated above among the candidate comment text stored in the candidate comment information database (FIG. 17) as a presentation comment text to be presented to the user.

After the step S332, the server 30 executes simulation response (S333).

Specifically, the processor 32 transmits the simulation response data to the client apparatus 10.

The simulation response data includes the following information:
- the image data of the target makeup image specified in the step S301; and
- the information regarding the target comment text specified in the step S332.

After the step S333, the client apparatus 10 executes presenting simulation result (S132).

Specifically, the processor 12 displays the screen P601 (FIG. 20) on the display based on the simulation response data.

The screen P601 includes display objects A601a to A601b.

The display object A601a includes a target makeup image corresponding to the image data included in the simulation response data (that is, a target makeup image whose target image score satisfies a predetermined condition).

The display object A601*b* includes information (for example, text) regarding the target comment text included in the simulation response data.

As described above, in the fourth variation, the target comment text for the presented target makeup image is presented.

Therefore, the user can get advice information and the like regarding the presented target makeup image.

Further, in the fourth variation, a target comment text for the presented target makeup image is generated based on the reference comment score associated with the evaluator ID specified by the user.

Therefore, it is possible to present the target comment text that matches the presented target decoration image and corresponds to the user's preference.

(6) Summary of the Present Embodiment

The present embodiment is summarized.

The first aspect of the present embodiment is an information processing apparatus (for example the server 30):

receives an image of target person to be decorated and at least one evaluator ID that identifies an evaluator different from the target person (for example, the processor 32 executing the step S300);

generates a plurality of target decoration images in which the image is decorated (for example, the processor 32 executing the step S300);

stores a plurality of reference decoration images in which images of a plurality of persons are decorated, a reference image score regarding evaluation by an evaluator for each reference decorative image, and evaluator ID of an evaluator evaluating the reference decorative image associated with each other (for example, the processor 32 managing the evaluator information database (FIG. 5));

calculates target image score for evaluation for each target decorative image based on the reference image score associated with the received evaluator ID among the plurality of reference image scores (for example, the processor 32 executing the step S301); and presents at least one target decorative image whose target image score satisfies a predetermined condition among the plurality of target decoration images (for example, the processor 32 executing the step S302).

According to the first aspect, it is possible to present a simulation result that matches the physical characteristics of the user and corresponds to the preference of the user.

The second aspect of the present embodiment is the information processing apparatus that receives designation of the reference image score from the evaluator for the generated target decorative image (for example, the processor 32 executing the step S321), and stores the generated target decorative image as a reference decorative image, and stores the reference decorative image, the reference image score designated by the evaluator, and the evaluator ID of the evaluator associated with each other.

According to the second aspect, the reference image score from the evaluator for the generated target decorative image is stored.

As a result, in the next and subsequent simulations, the target image score is calculated in consideration of the content of the feedback by the evaluator, so that it is possible to present the simulation result that makes the best utilization of the evaluator's unique sensibility (individuality).

The third aspect of the present embodiment is the information processing apparatus that receives designation of the reference image score from target person for the presented target decorative image (for example, the processor 32 executing the step S313), stores the presented target decorative image, the reference image score designated by the target person, and the target person ID that identifies the target person associated with each other, and calculates target image score for evaluation of the decorative images based on the reference image score associated with the received evaluator ID and the reference image score associated with the target person ID among the plurality of reference image scores.

According to the third aspect, the reference image score from the user for the presented target decorative image is stored.

As a result, in the next and subsequent simulations, by including the user himself in the designated evaluator, the target image score is calculated in consideration of the content of the feedback from the user, so that the simulation result that more corresponds to the user's preference may be presented.

The fourth aspect of the present embodiment is the information processing apparatus that receives generation conditions for the target decorative image (for example, the processor 32 executing the step S300), and generates the plurality of target decoration images based on the generation conditions.

According to the fourth aspect, the target decorative image corresponding to the generation conditions (user attributes, user's request, or the like) designated by the user is generated.

Therefore, it is possible to present the user with a simulation result that matches the attributes and preferences of the user.

A fifth aspect of the present embodiment is the decoration is a makeup for the face.

According to the fifth aspect, it is possible to present a simulation result that matches the physical characteristics of the user and corresponds to the user's preference with respect to the makeup for the face.

The sixth aspect of the present embodiment is information processing apparatus that stores cosmetic information regarding cosmetics corresponding to each of the plurality of target decoration images (for example, the processor 32 managing the makeup pattern information database (FIG. 4)), and presents (for example, the processor 32 executing the step S302) cosmetic information regarding cosmetics corresponding to the presented target decorative image.

According to the sixth aspect, information regarding cosmetics corresponding to the target decorative image is presented.

It is possible for the user to know the cosmetics required for actually makeup the presented target decorative image.

Therefore, the reproducibility of the makeup of target decorative image by the user is improved.

The seventh aspect of the present embodiment is the information processing apparatus that generates a target comment text for the presented target decorative image (for example, the processor 32 executing the step S332).

According to the seventh aspect, the target comment text for the presented target decorative image is presented.

Therefore, it is possible for the user to know advice information or the like regarding the presented target decorative image.

The eighth aspect of the present embodiment is the information processing apparatus that stores the plurality of reference decoration images, the reference comment text for each reference decorative image, the reference comment score regarding the evaluation by the evaluator for each reference comment text, and the evaluator ID of the evaluator evaluating the reference comment text associated with each other, and generates the target comment text is to generate a target comment text for the presented target decorative image based on the reference comment score associated with the received evaluator ID among the plurality of reference comment scores.

According to the eighth aspect, a target comment text for the presented target decorative image is generated based on the reference comment score associated with the evaluator ID designated by the user.

Therefore, it is possible to present a target comment text that matches the presented target decorative image and corresponds to the user's preference.

The ninth aspect of the present embodiment is the computer program that makes a computer (for example, a processor 32) function as each of the above.

(7) Other Variations

The memory 11 may be connected to the client apparatus 10 via the network NW.

The memory 31 may be connected to the server 30 via the network NW.

Each step of the above information processing may be executed by either the client apparatus 10 or the server 30.

In the present embodiment, an example in which "decoration" is makeup is shown, but the present embodiment is not limited to this.

Other examples of "decoration" include hair styling and clothing.

In the case of hair styling, the evaluator whose information stored in the evaluator information database includes, for example, a hair styling professional (hair stylist, or the like).

In the case of clothing, the evaluator whose information stored in the evaluator information database includes, for example, a clothing coordination professional (stylist, or the like).

In the present embodiment, the user has shown an example of being a target person of the makeup simulation, but the present embodiment is not limited to this.

The user may be an operator who provides a service to the target person (for example, a store staff of a makeup item store).

In the present embodiment, in specifying presented image (S301), an example of calculating the target image score of each target makeup image based on the comparison between the target makeup image and the reference makeup image is shown, but the present embodiment includes this. Not limited.

In specifying presented image (S301), it may be further based on the comparison between the target real face image and the reference real face image.

In addition to the above, examples of the generation conditions in the second variation include the following:

"SEASON" (associated with the makeup pattern ID of the makeup pattern information database (FIG. 16), in this case, the simulation results that match the season may be presented to the user;

"SCENE" (associated with the makeup pattern ID of the makeup pattern information database (FIG. 16), in this case, the simulation results that match the scene may be presented to the user);

"MAKEUP PATTERN CREATION TIME" (associated with the makeup pattern id of the makeup pattern information database (FIG. 16), in this case, the simulation results that correspond to the latest trends may be presented to the user);

"MAKEUP PATTERN CREATOR" (associated with the makeup pattern id of the makeup pattern information database (FIG. 16), in this case, the simulation results that match the user's preference);

The creator of the makeup pattern may be the same person as the evaluator, and the target makeup image is used using the makeup pattern image which is the same creator as the evaluator input by the user in the field object F400a.

"DIFFICULTY" (associated with the makeup pattern ID of the makeup pattern information database (FIG. 16), in this case, the simulation results that match the user's makeup technique may be presented to the user); and "EVALUATION DATE" (associated with the reference image ID of the reference image information database (FIG. 6, in this case, in the step S301, by using only the reference image score for the period designated by the user, the simulation result that match trends may be presented to the user).

In the third variation, an example in which a cosmetic name is presented as cosmetic information is shown, but the present embodiment is not limited to this.

The cosmetic information presented may be an image of cosmetics.

In the fourth variation, the comment text presented is an example of one specified candidate comment text, but the present embodiment is not limited to this.

The comment text presented may be, for example, a combination of a plurality of candidate comment texts.

For example, the candidate comment information database (FIG. 17) includes a "CANDIDATE COMMENT ATTRIBUTE" field. In the step S332, one comment text is specified from a plurality of candidate comment texts corresponding to one attribute. In the step S132, one comment text in which the comment texts corresponding to each attribute are connected is presented.

Examples of the candidate comment attribute include the following:

comment on facial features;
comment regarding the color of each part of the face;
comment on makeup technique; and
comments on the latest trends.

In the fourth variation, as in the first variation, the target comment text may also receive feedback regarding the evaluation of target comment text from at least one of the evaluator and the user.

In the fourth variation, generating target comment text (S332) shows an example based on the reference comment score, but the present embodiment is not limited to this.

For example, the makeup pattern information database (FIG. 4) includes a "COMMENT TEXT" field. In the step S332, the comment text associated with the makeup pattern image used to generate the target makeup image specified in the step S301 is specified. In the step S132, the specified comment text may be presented.

Although the embodiments of the present invention will be described in detail above, the scope of the present invention is not limited to the above embodiments.

Further, various modifications and changes can be made to the above embodiments without departing from the spirit of the present invention.

In addition, the above embodiments and variations can be combined.

REFERENCE SIGNS LIST

1: Information processing system
10: Client apparatus
11: Memory
12: Processor
13: Input and output interface
14: Communication interface
30: Server
31: Memory
32: Processor
33: Input and output interface
34: Communication interface

The invention claimed is:

1. An information processing apparatus:
receives an image of target person to be decorated and at least one evaluator ID that identifies an evaluator different from the target person;
generates a plurality of target decoration images in which the image is decorated;
stores a plurality of reference decoration images in which images of a plurality of persons are decorated, a reference image score regarding evaluation by an evaluator for each reference decorative image, and evaluator ID of an evaluator evaluating the reference decorative image associated with each other;
calculates target image score for evaluation for each target decorative image based on the reference image score associated with the received evaluator ID among the plurality of reference image scores; and
presents at least one target decorative image whose target image score satisfies a predetermined condition among the plurality of target decoration images,
wherein the decoration is a makeup for the face and
wherein the apparatus stores cosmetic information regarding cosmetics corresponding to each of the plurality of target decoration images, and
presents cosmetic information regarding cosmetics corresponding to the presented target decorative image.

2. The apparatus of claim 1, wherein the apparatus receives designation of the reference image score from the evaluator for the generated target decorative image, and
stores the generated target decorative image as a reference decorative image, and stores the reference decorative image, the reference image score designated by the evaluator, and the evaluator ID of the evaluator associated with each other.

3. The apparatus of claim 2, wherein the apparatus receives designation of the reference image score from target person for the presented target decorative image,
stores the presented target decorative image, the reference image score designated by the target person, and the target person ID that identifies the target person associated with each other, and
calculates target image score for evaluation of the decorative images based on the reference image score associated with the received evaluator ID and the reference image score associated with the target person ID among the plurality of reference image scores.

4. The apparatus of claim 1, wherein the apparatus receives generation conditions for the target decorative image, and
generates the plurality of target decoration images based on the generation conditions.

5. The apparatus of claim 1, wherein the apparatus generates a target comment text for the presented target decorative image.

6. The apparatus of claim 5, wherein the apparatus stores the plurality of reference decoration images, the reference comment text for each reference decorative image, the reference comment score regarding the evaluation by the evaluator for each reference comment text, and the evaluator ID of the evaluator evaluating the reference comment text associated with each other, and
generates the target comment text is to generate a target comment text for the presented target decorative image based on the reference comment score associated with the received evaluator ID among the plurality of reference comment scores.

7. A computer-implemented method comprising:
receiving an image of target person to be decorated and at least one evaluator ID that identifies an evaluator different from the target person;
generating a plurality of target decoration images in which the image is decorated;
storing a plurality of reference decoration images in which images of a plurality of persons are decorated, a reference image score regarding evaluation by an evaluator for each reference decorative image, and evaluator ID of an evaluator evaluating the reference decorative image associated with each other;
calculating target image score for evaluation for each target decorative image based on the reference image score associated with the received evaluator ID among the plurality of reference image scores; and
presenting at least one target decorative image whose target image score satisfies a predetermined condition among the plurality of target decoration images,
wherein the decoration is a makeup for the face; and
wherein the method further comprises:
storing cosmetic information regarding cosmetics corresponding to each of the plurality of target decoration images; and
presenting cosmetic information regarding cosmetics corresponding to the presented target decorative image.

8. The method of claim 7, the method further comprises:
receiving designation of the reference image score from the evaluator for the generated target decorative image;
storing the generated target decorative image as a reference decorative image, and stores the reference decorative image, the reference image score designated by the evaluator, and the evaluator ID of the evaluator associated with each other.

9. The method of claim 8, the method further comprises:
receiving designation of the reference image score from target person for the presented target decorative image;
storing the presented target decorative image, the reference image score designated by the target person, and the target person ID that identifies the target person associated with each other, and
calculating target image score for evaluation of the decorative images based on the reference image score associated with the received evaluator ID and the reference image score associated with the target person ID among the plurality of reference image scores.

10. The method of claim 9, the method further comprises:
receiving generation conditions for the target decorative image, and
generating the plurality of target decoration images based on the generation conditions.

11. The method of claim 9, wherein the decoration is a makeup for the face.

12. The method of claim 11, the method further comprises:
storing cosmetic information regarding cosmetics corresponding to each of the plurality of target decoration images, and
presenting cosmetic information regarding cosmetics corresponding to the presented target decorative image.

13. The method of claim 9, the method further comprises generating a target comment text for the presented target decorative image.

14. The method of claim 8, the method further comprises:
receiving generation conditions for the target decorative image; and
generating the plurality of target decoration images based on the generation conditions.

15. The method of claim 7, the method further comprises generating a target comment text for the presented target decorative image.

16. The method of claim 15, the method further comprises:
storing the plurality of reference decoration images, the reference comment text for each reference decorative image, the reference comment score regarding the evaluation by the evaluator for each reference comment text, and the evaluator ID of the evaluator evaluating the reference comment text associated with each other, and
generating the target comment text is to generate a target comment text for the presented target decorative image based on the reference comment score associated with the received evaluator ID among the plurality of reference comment scores.

17. An information processing apparatus:
receives an image of target person to be decorated and at least one evaluator ID that identifies an evaluator different from the target person;
generates a plurality of target decoration images in which the image is decorated;
stores a plurality of reference decoration images in which images of a plurality of persons are decorated, a reference image score regarding evaluation by an evaluator for each reference decorative image, and evaluator ID of an evaluator evaluating the reference decorative image associated with each other;
calculates target image score for evaluation for each target decorative image based on the reference image score associated with the received evaluator ID among the plurality of reference image scores; and
presents at least one target decorative image whose target image score satisfies a predetermined condition among the plurality of target decoration images,
wherein the apparatus generates a target comment text for the presented target decorative image; and
the apparatus stores the plurality of reference decoration images, the reference comment text for each reference decorative image, the reference comment score regarding the evaluation by the evaluator for each reference comment text, and the evaluator ID of the evaluator evaluating the reference comment text associated with each other, and
generates the target comment text is to generate a target comment text for the presented target decorative image based on the reference comment score associated with the received evaluator ID among the plurality of reference comment scores.

* * * * *